United States Patent [19]

Okino et al.

[11] Patent Number: 4,833,536
[45] Date of Patent: May 23, 1989

[54] IMAGE SENSING APPARATUS WITH SENSITIVITY AND EXPOSURE CONTROL

[75] Inventors: Tadashi Okino; Shinji Sakai, both of Kanagawa, Japan

[73] Assignee: Canon Kabushiki Kaisha

[21] Appl. No.: 243,204

[22] Filed: Sep. 9, 1988

Related U.S. Application Data

[63] Continuation of Ser. No. 129,417, Nov. 25, 1987, abandoned, which is a continuation of Ser. No. 758,150, Jul. 23, 1985, abandoned.

[30] Foreign Application Priority Data

Jul. 24, 1984 [JP] Japan .................. 59-154698
Jul. 24, 1984 [JP] Japan .................. 59-154699

[51] Int. Cl.$^4$ .............. H04N 5/235; H04N 5/238
[52] U.S. Cl. ................... 358/228; 358/209; 358/219
[58] Field of Search .......... 358/209, 219, 228; 354/471, 289.1; 340/715, 793

[56] References Cited

U.S. PATENT DOCUMENTS

| | | | |
|---|---|---|---|
| 2,901,539 | 8/1959 | Morgan | 358/228 |
| 3,086,077 | 4/1963 | Mayer | 358/228 |
| 3,691,302 | 9/1972 | Gaebele et al. | 358/219 |
| 4,025,955 | 5/1977 | Grallien et al. | 358/219 |
| 4,050,085 | 9/1977 | Prince et al. | 358/219 |
| 4,141,043 | 2/1979 | Liu | 358/219 |
| 4,152,055 | 5/1979 | Ohta et al. | 354/471 |
| 4,174,526 | 11/1979 | Geurts | 358/219 |
| 4,409,472 | 10/1983 | Kimura | 358/228 |
| 4,427,996 | 1/1984 | Tamura | 358/228 |
| 4,495,520 | 1/1985 | Kravitz et al. | 358/219 |
| 4,532,553 | 7/1985 | Brill | 358/228 |
| 4,542,403 | 9/1985 | Zimmermann et al. | 358/228 |
| 4,554,587 | 11/1985 | Ooi | 358/228 |

OTHER PUBLICATIONS

Pentax Brochure: Instructions for Program Plus Model, p. 51, ©Asahi Optical, 6/84.

*Primary Examiner*—Jin F. Ng
*Assistant Examiner*—Stephen Brinich
*Attorney, Agent, or Firm*—Toren, McGeady & Associates

[57] ABSTRACT

An image sensing apparatus having simple structural arrangement and improved responsivity includes an image sensor arranged to convert an optical image into an electrical signal; an exposure control circuit arranged to control an exposure state of the image sensor; a sensitivity control circuit arranged to control a sensitivity of the apparatus; and an arithmetic control circuit arranged to have the sensitivity increased to a predetermined degree by the sensitivity control circuit and to have a degree of exposure, controlled by the exposure control circuit, decreased approximately to the above-stated predetermined degree when an exposure condition is outside of the exposure controllable limits of the exposure control circuit. Since the apparatus has the sensitivity control circuit arranged to automatically control the sensitivity of the apparatus in combination with a display circuit which is arranged to display the operating state of the sensitivity control circuit, an erroneous operation can be prevented.

22 Claims, 4 Drawing Sheets

IMAGE SENSING APPARATUS WITH SENSITIVITY AND EXPOSURE CONTROL

This is a continuation application of Ser. No. 129,417, filed Nov. 25, 1987, and now abandoned, which is a continuation application of Ser. No. 758,150, filed July 23, 1985, and now abandoned.

BACKGROUND OF THE INVENTION

1. Field of the Invention

This invention relates to an image sensing apparatus having image sensing means arranged to have the sensitivity thereof controllable.

2. Description of the Prior Art

In taking a picture of an object with an image sensing apparatus, the sensitivity of currently available image sensors is insufficient for an object of low brightness or luminance. To solve this problem, it has been the practice either to use artificial illumination or to raise the apparent sensitivity of the image sensor by electrically increasing the gain of a signal processing system. The details of this latter arrangement of electrically raising the image sensor sensitivity are as follows: Conventional video cameras include cameras of the kind provided with an ALC circuit for automatically controlling the aperture of an iris according to the output of the image sensor. In the case of the video camera of this kind, the gain of the signal processing circuit is arranged to be automatically increased in the event that the mean value of the output level of the image sensor is lower than an adequate value with the iris opened to its maximum aperature.

In the case of the arrangement to have the gain automatically increased, however, the S/N ratio of a video signal sometimes suddenly changes halfway through the image sensing operation apart from the intention of the operator. In other words, with the gain increased, the internal noise of the image sensor is also amplified resulting in a sudden degradation of picture quality. However, in most cases, the operator is unaware of the occurrence of this sudden degradation, because, in the case of a compact electronic view finder (EVF) arrangement, it is nearly impossible to discriminate such a change in the S/N ratio.

Further, during recent years, there has been a development in the field of image sensing apparatuses to devise arrangements for sensing a still picture image. It is necessary for a still picture image sensing apparatus to accomplish the sensitivity control and exposure control within a short period of time. Therefore, a servo control arrangement or the like which takes a long time is inadequate for that purpose. Furthermore, a continuous control arrangement for sensitivity control is also inadequate both in terms of time and structural arrangement. More specifically, an arrangement for continuously controlling the sensitivity requires, among others, digital-to-analog (D/A) conversion of a control signal, which complicates the structural arrangement thereof. Then, any attempt to avoid such complexity by dispersively accomplishing the sensitivity control in accordance with the conventional arrangement, results in a long pursuing time required by the exposure control servo device such as an iris, etc.

SUMMARY OF THE INVENTION

It is a principal object of the present invention to solve the above-stated problems of the apparatuses of the prior art.

It is a more specific object of the invention to provide an arrangement for informing the operator without fail, of whether the photographing operation is being performed with the sensitivity of the apparatus having been increased, so that a photographing failure due to inadvertently increased sensitivity can be prevented.

It is another object of the invention to provide an image sensing apparatus which permits simplification of the structural arrangement thereof and excels in the responsiveness of the exposure control.

To attain these objects, an image sensing apparatus embodying this invention is provided with sensitivity control means for automatically controlling the sensitivity of the apparatus and display means for displaying the operating state of the sensitivity control means. The embodiment is, therefore, capable of preventing formation of any unwanted image that degrades picture quality.

An image sensing apparatus arranged as another embodiment of the invention, is provided with image sensing means which converts an optical image into an electrical signal; exposure control means for controlling the exposure state of the image sensing means; sensitivity control means for controlling the sensitivity of the apparatus; and arithmetic control means which is arranged to have the sensitivity increased to a predetermined degree by the sensitivity control means and to have the degree of exposure by the exposure control means decreased substantially to a predetermined degree when an exposure condition is outside of the exposure controllable limits of the exposure control circuit. The degree of exposure thus can be kept within the limits of exposure control. Further, since the sensitivity control can be dispersively carried out, the embodiment permits simplification of structural arrangement and also has an improved responsiveness of exposure control.

The above and further objects and features of this invention will become apparent from the following detailed description of an embodiment thereof taken in connection with the accompanying drawings.

DETAILED DESCRIPTION OF THE PREFERRED EMBODIMENTS

Figure 1:
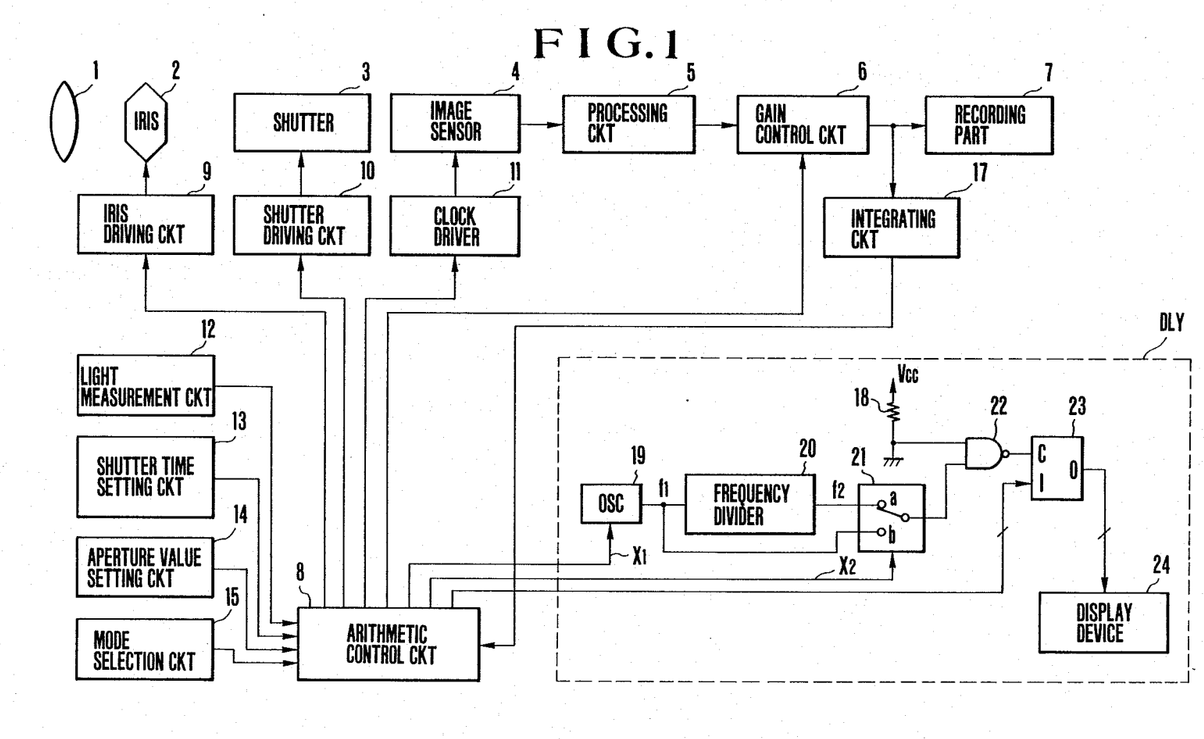
FIG. 1 is a block diagram showing, by way of example, the arrangement of an image sensing apparatus embodying the present invention.

The details of the invention will be understood from the following description of an embodiment thereof. FIG. 1 shows the circuit arrangement of the embodiment. The arrangement includes an optical system 1 which is arranged to form an image of an object to be photographed; an iris 2; a shutter 3 which forms exposure control means in conjunction with the iris 2; an image sensor element 4 which may be a CCD, a camera tube, or the like; a processing circuit 5; a gain control circuit 6 which is provided for sensitivity control; and a recording part 7.

An arithmetic control circuit 8 is arranged to generate photographing conditions by performing a computing operation on the outputs of a light measurement circuit 12, a shutter time setting circuit 13, an aperture value setting circuit 14, a mode selection circuit 15, an integrating circuit 17, etc. The integrating circuit 17 is arranged to integrate a video signal obtained via the gain control circuit 6. The arithmetic control circuit 8 controls, on the basis of the photographing conditions thus obtained by computation, an iris driving circuit 9 for driving the iris 2; a shutter driving circuit 10 for driving the shutter 3; a clock driver 11 for driving the image sensor 4; the gain control circuit 6; an oscillator 19; and a switch circuit 21. In addition to that, the circuit 8 supplies exposure information, etc., to the input terminal of a gate circuit 23 for display by a display device 24.

The oscillator 19 is arranged to flicker cause the display of the display device 24 to flicker. Reference numerals 20 and 22 denote a frequency divider and a NAND gate, respectively. A resistor 18 is arranged to form a high level potential. A block DLY represents a display unit which includes, for example, a seven-segment display device 24.

Figure 2A:
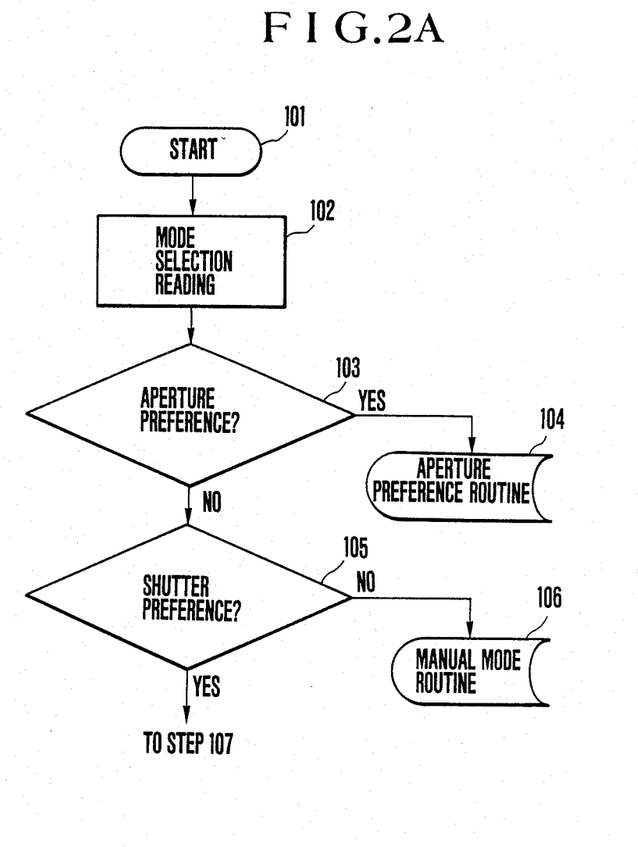
FIGS. 2A, 2B and 2C are flow charts showing the operation of the image sensing apparatus according to the invention.
Figure 2B:
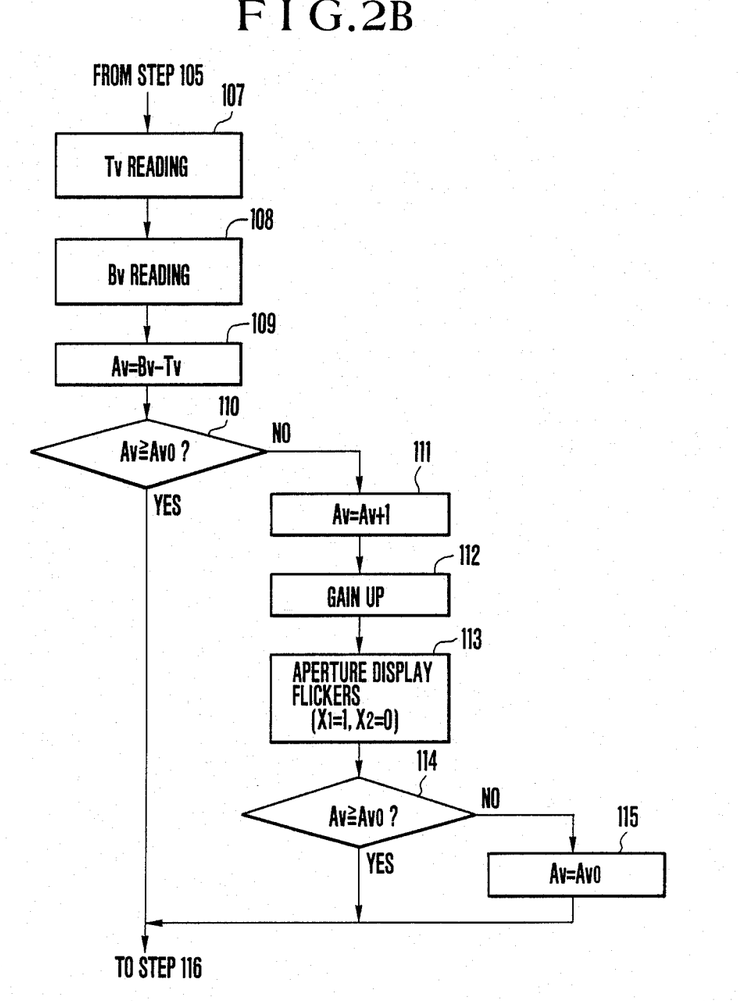
Figure 2C:
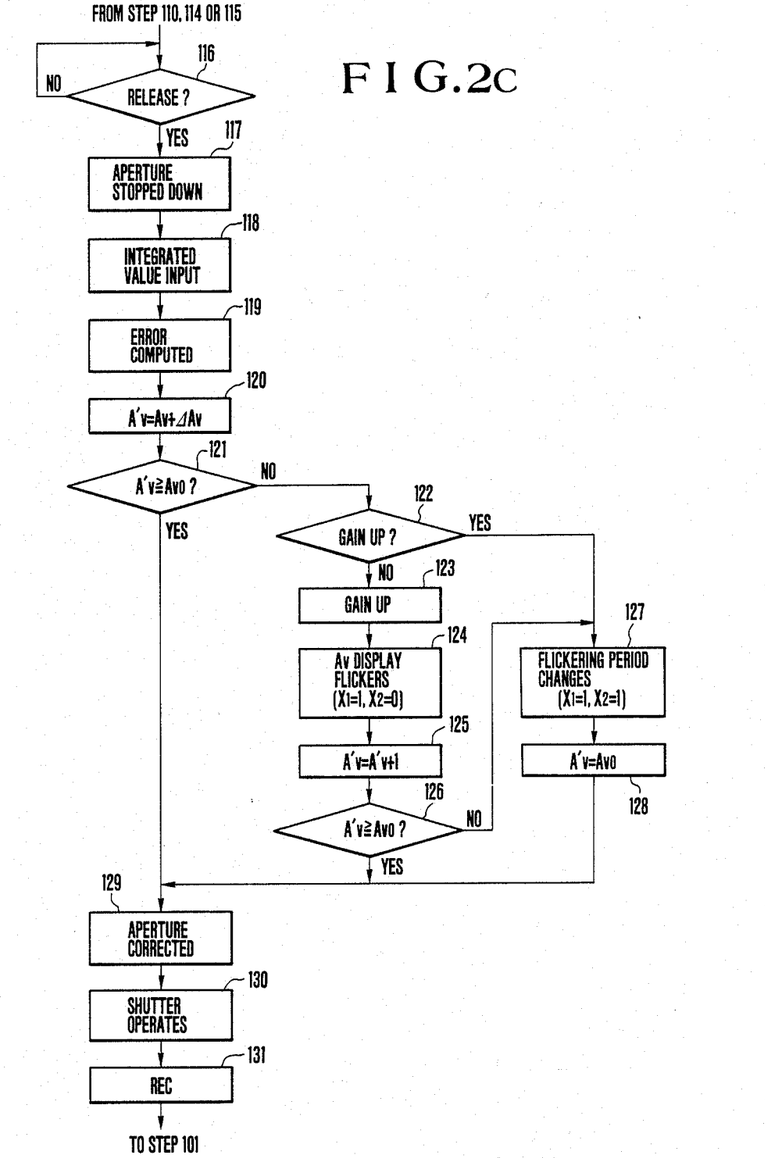

Referring to FIGS. 2A, 2B and 2C which are flow charts, the arithmetic control circuit 8 of this embodiment operates as follows: At a step 101 in FIG. 2A, a program within the arithmetic control circuit 8 starts when a power supply (not shown) is switched on. Then, at a step 102, the mode setting is read from the mode setting circuit 15. At a step 103, whether or not an aperture preference mode is selected is examined. If it is selected, the operation proceeds to the sub-routine for the aperture preference mode at a step 104. If the aperture preference mode is found not selected at the step 103, whether or not a shutter preference mode is selected is discriminated at a next step 105. If the shutter preference mode is found not selected, the operation proceeds to a step 106 which is the sub-routine for a manual mode. In the selection of the shutter preference mode, the operation proceeds to a step 107. The operation of the control circuit 8 in the shutter preference mode, in the case of this specific embodiment, is as follows:

FIGS. 2B and 2C show the operation in the shutter preference mode. First, at a step 107, the control circuit 8 reads a shutter time value Tv which has been set at the shutter time setting circuit 13. The value Tv is one of the exposure defining values and is a time value obtained by the known APEX system (additive system of photographic exposure). At a next step 108, a light measurement value Bv is read from the light measurement circuit 12. The value Bv is a luminance value obtained by the APEX system. The light measurement circuit 12 is arranged to detect, by means of an SPC, or the like, a portion of a light flux obtained, for example, in the rear of the iris 2. Following this, at a step 109, the control circuit computes $Av = Bv - Tv$. The value Av is one of the exposure defining values and is an aperture value obtained by the APEX system.

At a step 110, whether the above-stated aperture value Av is equal to or above an aperture value Avo obtained with the lens fully open, that is, beyond an exposure controllable limit, is determined. If not, that is, when the aperture value Av is found smaller than the full open or maximum aperture value Avo, the aperture value Av of the iris is increased by one step at a step 111. In other words, the aperture is stopped down by one step to make the opening degree of the iris $\frac{1}{2}$ of the aperture value Av. Further, at a step 112, the gain of the gain control circuit 6 is increased by two times. Following this, at step 113, the aperture value display is flickered at the display device 24 by causing the outputs X1 and X2 of the arithmetic control circuit 8 to be at "1" and "0", respectively.

More specifically, both the outputs X1 and X2 are normally at "0". Under that condition, the oscillation of the oscillator 19 is at rest and the switch 21 is connected to the terminal "a" thereof. The output of the NAND gate 22 at a high level. The input signal of the gate circuit 23 is then produced, as it is, as an output signal. Meanwhile, the results of various computing operations performed by the arithmetic control circuit 8 are supplied to the gate circuit 23 as input signals thereof. Under a normal condition, therefore, these input signals are displayed, as they are, by the seven-segment diaplay device 24.

However, when the output X1 of the control circuit 8 becomes "1" at the step 113, the oscillator 19 begins to oscillate and the gate circuit 23 is alternately opened and closed according to a divided frequency f2 of an oscillation signal from the oscillator 19. The display value at the display device 24 then flickers, accordingly. Further, since the shutter preference mode is selected in this case, an aperture value, supplied by the control circuit 8, is displayed at the display device 24.

At a step 114 which follows the step 113, whether the aperture value Av is equal to or above the maximum aperture value Avo obtained with the lens fully opened, is again determined. If not, the aperture value Av is set at the value Avo at a step 115. In the event of $Av \geq Avo$ at either of the steps 110 or 114, or when the aperture value Av is set at the maximum aperture value Avo at the step 115 as mentioned above, the operation proceeds to a next step 116. The step 116 and steps subsequent thereto are image sensing processes.

At the step 116, it is determined whether or not a release switch (not shown) has been turned on. If the release switch is found on, the operation proceeds to a step 117. At the step 117, the iris driving circuit 9 is driven by the output of the arithmetic control circuit 8. The iris 2 is then stopped down to a position corresponding to the above-stated aperture value Av. At a step 118, the integrated output of the integrating circuit 17 is supplied to the arithmetic control circuit 8. Following this, light measurement is performed by means of the image sensor 4 through the actual aperture of the iris 2 obtained with the iris 2 stopped down to the aperture value Av. At a step 119, again an aperture value is computed by using the results B'v of the above-stated actual light measurement and the setting value Tv of the shutter time setting circuit 13. A re-computed aperture value A'v is thus obtained by computation of $A'v = B'v - Tv$. Further, an aperture error $\Delta Av = A'v - Av$ is obtained. At a step 120, the value $\Delta Av$ is added to the value Av and the iris is controlled to have the aperture value A'v.

At a step 121, the adjusted aperture value A'v is checked to see if it is equal to or above the maximum aperture value Avo. If it is found to be smaller, the operation proceeds to a step 122. At the step 122, whether the gain of the gain control circuit 6 has already been raised by one step is examined. If the gain is found not raised as yet, the gain is increased by two times at a step 123. After that, the adjusted aperture value A'v is displayed by flickering the value being displayed at a step 124 in the same manner as at the step 113.

At a further step 125, the aperture value is again increased (the iris is stopped down) by one step. At a step 126, whether this aperture value A'v is equal to or above the maximum aperture value Avo is examined. In the event of A'v≧Avo, the operation proceeds to a further step 129, because the exposure control can be accomplished at an aperture value that is larger than the maximum aperture value Avo. However, in case that the gain is found having been already raised at the step 122 or a condition of A'V<Avo is found at the step 126, the flickering rate is changed at the step 127 on the basis of a decision that no adequate exposure control is possible in either case. More specifically, the switch 21 is connected to a terminal "b" thereof with the outputs X1 and X2 changed to "1", respectively, and then a frequency signal f1 is supplied to the input terminal of the NAND gate 22. This causes the flickering rate to be quickened at the display device 24.

Following this, the aperture value A'v is set at the value Avo at a step 128, and the operation proceeds to the step 129.

Note that at the step 121, if a condition of A'v≧Avo is detected, the operation proceeds directly to the step 129 as exposure control can be adequately accomplished under this condition. At the step 129, the aperture position of the iris is adjusted to the value A'v. Then, at a step 130, an exposure is effected with the shutter 3 caused to open for a predetermined period of time. At a step 131, an image, formed by this exposure, is read out and is processed at the processing circuit 5. A signal thus obtained from the processing circuit 5 is supplied, via the gain control circuit 6, to the recording part 7 to be recorded there.

After recording, if the power supply is still on, the same control operation is repeated again from the step 101.

In accordance with the arrangement of this embodiment, as mentioned in the foregoing, the operator knows of any sudden change in the sensitivity of the image sensing apparatus due to a change in exposure conditions, so that an inadequate image sensing operation can be prevented. For example, it becomes possible, instead of performing an image sensing operation with the apparent sensitivity raised by increasing the gain, to perform it, for example, after rearranging illumination to brighten the object for improved picture quality.

The arrangement to flicker the display for indicating the gain increased condition permits simplification of the display device without use of an additional display element for that purpose. In addition to that, in case that the exposure still cannot be adequately effected even after the increase of the gain, the flickering rate of the display is changed. This arrangement represents another advantageous feature of the embodiment.

The degree to which the sensitivity of the image sensor is to be increased may be arranged to vary with the degree of insufficiently of exposure. For example, it may be increased by one step or two steps according to the degree of insufficiency and the oscillation (flickering) period may be changed according to the change in the increasing degree.

While the operation of the embodiment has been described as performed in the shutter preference mode, the embodiment operates in exactly the same manner also in other modes, such as the aperture preference mode, a programmed operation mode, etc. In such a case, the display of a shutter speed value (instead of the aperture value) is likewise changed stepwise to give a warning with respect to the increase in gain or a warning against an insufficient exposure.

In the case of this specific embodiment, the operating state of the sensitivity control means is arranged to be displayed by means of the flickering period of a display. However, this arrangement may be replaced with arrangement for numerically displaying the sensitivity value or changing the color of a display of some other information.

Further, when a photographing condition is found outside of exposure controllable limits, the embodiment performs a control operation to increase the sensitivity thereof to a predetermined degree and to decrease the exposure degree to an extent corresponding to the above-stated predetermined degree. Therefore, the degree of exposure can be kept within an exposure controllable range. Further, since a desired value is predetermined, the exposure control can be accomplished with quick responsiveness. Therefore, the length of time required for exposure control can be shortened without impairing the responsiveness of the image sensing apparatus even when the sensitivity control is performed in a dispersive manner. This permits simplification of the arrangement required for the sensitivity control.

In this specific embodiment, the degree of exposure control is reduced to ½ when the sensitivity is increased by two times. Generally, however, in the neighborhood of a full lens opening aperture value, the aperture position of the iris sometimes somewhat deviates from the actual aperture of the lens. In that event, the exposure cannot be effected at an apposite level with the exposure control degree reduced to 1/n in exact correlation with the sensitivity when the latter is increased "n" times. Accordingly, the exposure degree should be arranged to be controlled with this possible error duly taken into consideration under the above-stated condition.

In accordance with this invention, this arrangement is also included in the apparatus.

While the iris is alone described as the exposure control means in the foregoing description of the embodiment, the shutter may alternatively be used in place of the iris for that purpose, or both of them may be used in combination.

Further, in the case of this specific embodiment, the sensitivity is arranged to be increased by one step (or by two times) for the sake of simplification of description. However, in accordance with this invention, the sensitivity may be arranged to be increased by two steps or more, as desired.

What is claimed is:

1. An image sensing apparatus for converting an image of an object to be photographed into electrical image information, comprising:
   sensitivity control means for automatically controlling a sensitivity of the image sensing apparatus in a plurality of levels;
   display means for displaying an operating state of said sensitivity control means; and
   oscillation means for driving and display means to periodically flash and for increasing a frequency of flashing of said display means according to an increase of the level of sensitivity by said sensitivity control means.

2. An apparatus according to claim 1, wherein said sensitivity control means includes a gain control circuit which controls a gain of an image signal obtained by the image sensing apparatus.

3. An apparatus according to claim 1, wherein said sensitivity control means automatically controls the sensitivity of the image sensing apparatus according to a luminance of said object.

4. An apparatus according to claim 1, further comprising a camera tube.

5. An apparatus according to claim 4, wherein said sensitivity control means controls said sensitivity by controlling a bias level of a target electrode of said camera tube.

6. An apparatus according to claim 1, wherein said oscillation means has a mode in which it causes said display means to flash periodically in correspondence to the operation state of said sensitivity control means and another mode in which it causes said display means not to flash periodically.

7. An image sensing apparatus comprising:
image sensing means for converting an optical image into an electrical signal;
exposure control means for controlling an exposure amount of said image sensing means;
sensitivity control means for controlling a sensitivity of said image sensing apparatus; and
correcting means for correcting said electrical signal by increasing the sensitivity in a predetermined rate by said sensitivity control means, and by decreasing the exposure amount in said predetermined rate by said exposure control means in accompaniment with said increasing of the sensitivity.

8. An apparatus according to claim 7, wherein said sensitivity control means includes a gain control circuit which controls a gain of said image sensing means.

9. An apparatus according to claim 7, wherein said image sensing means includes a camera tube.

10. An apparatus according to claim 9, wherein said sensitivity control means controls said sensitivity by controlling a bias level of a target electrode of said camera tube.

11. An apparatus according to claim 7, further comprising:
display means for displaying an increase in said sensitivity when said sensitivity control means is caused to increase said sensitivity by said correcting means.

12. An apparatus according to claim 11, wherein said display means changes the displaying state thereof according to the rate of increase of said sensitivity.

13. An apparatus according to claim 12, wherein said display means changes a flickering period of a display thereof according to the rate of increase of said sensitivity.

14. An apparatus according to claim 11, wherein said display means includes display elements for displaying numerical figures.

15. An apparatus according to claim 11, further comprising:
display control means for causing said display means to display information concerning the control by said exposure control means.

16. An apparatus according to claim 15, wherein said display means is driven by oscillation means while displaying said information.

17. An apparatus according to claim 7, wherein said correcting means corrects said electrical signal when an exposure condition of said exposure control means is outside of a predetermined exposure control range.

18. An apparatus according to claim 17, further comprising warning means for warning in case the exposure condition is still outside of said predetermined exposure control range after said correcting by said correcting means.

19. An image sensing method comprising the steps of:
(a) deriving an exposure condition according to a condition of an object to be photographed;
(b) discriminating whether or not said exposure condition derived by said deriving step is within a predetermined range of said exposure condition;
(c) performing a gain increasing operation to increase the electrical sensitivity of an image sensing apparatus in a predetermined rate upon detection by said discriminating step that said derived exposure condition is outside of said predetermined range of said exposure condition;
(d) decreasing said derived exposure condition at the same rate as said rate of increase in sensitivity, and
(e) warning in case the exposure conditions are outside of said predetermined range even with decreasing of the degree of exposure following said gain increasing at said predetermined rate.

20. A method according to claim 19, further comprising:
a step of displaying the occurrence of said gain increasing operation in accompaniment with said operation is performed.

21. An image sensing apparatus, comprising:
(a) image pick-up means for converting an optical image into an electrical picture image signal;
(b) first control means for controlling exposure relative to said image pick-up means;
(c) second control means for controlling a gain of said electrical picture image signal converted by said image pick-up means; and
(d) a common display element for simultaneously displaying control conditions of said first and second control means, wherein said common display element flickers a display thereof in accordance with one of the control conditions of said first and second control means.

22. An apparatus according to claim 21, further comprising correcting means for correcting said electrical image signal by increasing a sensitivity in a predetermined rate of said second control means and by decreasing the exposure in said predetermined rate by said first control means in accompaniment with said increasing of the sensitivity.

* * * * *

UNITED STATES PATENT AND TRADEMARK OFFICE
CERTIFICATE OF CORRECTION

PATENT NO. : 4,833,536

DATED : May 23, 1989

INVENTOR(S) : Tadashi Okino, et al.

It is certified that error appears in the above-identified patent and that said Letters Patent is hereby corrected as shown below:

The title page should be deleted to appear as per attached title page.

Signed and Sealed this

Thirtieth Day of July, 1991

Attest:

HARRY F. MANBECK, JR.

Attesting Officer

Commissioner of Patents and Trademarks

United States Patent [19]

Okino et al.

[11] Patent Number: 4,833,536
[45] Date of Patent: May 23, 1989

[54] IMAGE SENSING APPARATUS WITH SENSITIVITY AND EXPOSURE CONTROL

[75] Inventors: Tadashi Okino; Shinji Sakai, both of Kanagawa, Japan

[73] Assignee: Canon Kabushiki Kaisha

[21] Appl. No.: 243,204

[22] Filed: Sep. 9, 1988

Related U.S. Application Data

[63] Continuation of Ser. No. 129,417, Nov. 25, 1987, abandoned, which is a continuation of Ser. No. 758,150, Jul. 23, 1985, abandoned.

[30] Foreign Application Priority Data

Jul. 24, 1984 [JP] Japan ................................ 59-154698
Jul. 24, 1984 [JP] Japan ................................ 59-154699

[51] Int. Cl.⁴ ..................... H04N 5/235; H04N 5/238
[52] U.S. Cl. ............................... 358/228; 358/209; 358/219
[58] Field of Search ............... 358/209, 219, 228; 354/471, 289.1; 340/715, 793

[56] References Cited

U.S. PATENT DOCUMENTS

| | | | |
|---|---|---|---|
| 2,901,539 | 8/1959 | Morgan | 358/228 |
| 3,086,077 | 4/1963 | Mayer | 358/228 |
| 3,691,302 | 9/1972 | Gaebele et al. | 358/219 |
| 4,025,955 | 5/1977 | Grallien et al. | 358/219 |
| 4,050,085 | 9/1977 | Prince et al. | 358/219 |
| 4,141,043 | 2/1979 | Liu | 358/219 |
| 4,152,055 | 5/1979 | Ohta et al. | 354/471 |
| 4,174,526 | 11/1979 | Geurts | 358/219 |
| 4,409,472 | 10/1983 | Kimura | 358/228 |
| 4,427,996 | 1/1984 | Tamura | 358/228 |
| 4,495,520 | 1/1985 | Kravitz et al. | 358/219 |
| 4,532,553 | 7/1985 | Brill | 358/228 |
| 4,542,403 | 9/1985 | Zimmermann et al. | 358/228 |
| 4,554,587 | 11/1985 | Ooi | 358/228 |

OTHER PUBLICATIONS

Pentax Brochure: Instructions for Program Plus Model, p. 51, ©Asahi Optical, 6/84.

*Primary Examiner*—Jin F. Ng
*Assistant Examiner*—Stephen Brinich
*Attorney, Agent, or Firm*—Toren, McGeady & Associates

[57] ABSTRACT

An image sensing apparatus having simple structural arrangement and improved responsivity includes an image sensor arranged to convert an optical image into an electrical signal; an exposure control circuit arranged to control an exposure state of the image sensor; a sensitivity control circuit arranged to control a sensitivity of the apparatus; and an arithmetic control circuit arranged to have the sensitivity increased to a predetermined degree by the sensitivity control circuit and to have a degree of exposure, controlled by the exposure control circuit, decreased approximately to the above-stated predetermined degree when an exposure condition is outside of the exposure controllable limits of the exposure control circuit. Since the apparatus has the sensitivity control circuit arranged to automatically control the sensitivity of the apparatus in combination with a display circuit which is arranged to display the operating state of the sensitivity control circuit, an erroneous operation can be prevented.

22 Claims, 4 Drawing Sheets